US010920818B2

(12) United States Patent
Cowan et al.

(10) Patent No.: US 10,920,818 B2
(45) Date of Patent: Feb. 16, 2021

(54) ANCHORING WASHER FOR AN EME PROTECTION CAP SYSTEM

(71) Applicant: THE BOEING COMPANY, Chicago, IL (US)

(72) Inventors: Daniel J. Cowan, North Charleston, SC (US); Bart Stevens, Summerville, SC (US); Sean Auffinger, Ladson, SC (US); Brandon Mulligan, Charleston, SC (US); Carl A. Weeks, North Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 209 days.

(21) Appl. No.: 15/964,340

(22) Filed: Apr. 27, 2018

(65) Prior Publication Data
US 2019/0331160 A1    Oct. 31, 2019

(51) Int. Cl.
F16B 39/24    (2006.01)
B64D 45/02    (2006.01)
F16B 33/00    (2006.01)
F16B 37/14    (2006.01)

(52) U.S. Cl.
CPC .............. F16B 39/24 (2013.01); B64D 45/02 (2013.01); F16B 33/004 (2013.01); F16B 37/14 (2013.01)

(58) Field of Classification Search
CPC ...... F16B 33/004; F16B 37/14; F16B 37/125; F16B 39/24; B64D 42/02; Y10S 411/91
USPC ........................... 411/372.5, 372.6, 373, 374
See application file for complete search history.

(56) References Cited

U.S. PATENT DOCUMENTS 1,025,706 A * 5/1912 McCloy et al. ........ F16B 37/14
                                                        411/374
1,364,185 A * 1/1921 Dodds ...................... F22B 7/16
                                                        411/374
1,366,722 A * 1/1921 Dodds ...................... F22B 7/16
                                                        411/374

(Continued)

FOREIGN PATENT DOCUMENTS

CA    2856687 A1    3/2015
CA    2858461 A1    3/2015

(Continued)

OTHER PUBLICATIONS

Extended EP Search Report for EP Application No. 19207962.2 dated Mar. 26, 2020.

(Continued)

Primary Examiner — Roberta S Delisle
(74) Attorney, Agent, or Firm — Marshall, Gerstein & Borun LLP

(57) ABSTRACT

A cap system for enclosing a metallic fastener assembly extending through a structure includes a first securement mechanism positioned about a periphery of a washer of the metallic fastener assembly wherein the first securement mechanism includes threads. The cap system further includes a cap member including a sidewall having an inner surface which defines a cavity dimensioned to receive the washer and defines a second securement mechanism complementary configured to engage the first securement mechanism positioned about the periphery of the washer. An end of the sidewall of the cap member defines an opening which provides the washer to have access into the cavity.

21 Claims, 9 Drawing Sheets

(56) References Cited

U.S. PATENT DOCUMENTS

| | | | | |
|---|---|---|---|---|
| 1,399,698 | A | * | 12/1921 | Dodds ................. F22B 7/16 |
| | | | | 411/374 |
| 1,868,084 | A | | 7/1932 | Wheelwright |
| 2,020,522 | A | * | 11/1935 | Seguin ................. F16B 37/14 |
| | | | | 411/374 |
| 3,699,368 | A | | 10/1972 | Palmer |
| 4,013,190 | A | | 3/1977 | Wiggins et al. |
| 4,295,766 | A | | 10/1981 | Shaw |
| 4,519,974 | A | | 5/1985 | Bravenec et al. |
| 4,630,168 | A | | 12/1986 | Hunt |
| 4,636,446 | A | | 1/1987 | Lee |
| 4,826,380 | A | | 5/1989 | Henry |
| 5,108,853 | A | | 4/1992 | Feres |
| 5,350,266 | A | | 9/1994 | Espey et al. |
| 5,590,992 | A | * | 1/1997 | Russell ................. B60B 7/14 |
| | | | | 301/37.374 |
| 5,752,794 | A | | 5/1998 | Krawczak |
| 6,102,128 | A | | 8/2000 | Bridgeman |
| 6,238,158 | B1 | * | 5/2001 | Clements ............... F16B 37/14 |
| | | | | 411/372.6 |
| 6,318,942 | B1 | | 11/2001 | Wieczorek |
| 7,134,666 | B2 | | 11/2006 | Beyssac et al. |
| 7,755,876 | B2 | | 7/2010 | Morrill et al. |
| 7,918,081 | B2 | | 4/2011 | Schlichting et al. |
| 7,936,550 | B2 | | 5/2011 | Morrill et al. |
| 8,388,293 | B2 | | 3/2013 | Hutter, III |
| 8,711,541 | B2 | | 4/2014 | Umemoto et al. |
| 8,717,735 | B2 | | 5/2014 | Day et al. |
| 8,717,736 | B2 | | 5/2014 | Asahara et al. |
| 8,840,740 | B2 | | 9/2014 | Rorabaugh et al. |
| 8,894,338 | B2 | | 11/2014 | Dobbin et al. |
| 9,188,226 | B2 | | 11/2015 | Pajel et al. |
| 9,228,604 | B2 | | 1/2016 | Dobbin |
| 2008/0137259 | A1 | | 6/2008 | Heeter et al. |
| 2009/0194297 | A1 | | 8/2009 | Ortiz Teruel |
| 2012/0217673 | A1 | | 8/2012 | Hutter, III |
| 2013/0206759 | A1 | | 8/2013 | Wurz et al. |
| 2013/0223951 | A1 | | 8/2013 | Bessho et al. |
| 2013/0336743 | A1 | * | 12/2013 | Hill ..................... F16B 37/14 |
| | | | | 411/372.6 |
| 2014/0048198 | A1 | | 2/2014 | Dobbin et al. |
| 2014/0261956 | A1 | | 9/2014 | Wiseman et al. |
| 2014/0341675 | A1 | | 11/2014 | Dobbin |
| 2015/0060465 | A1 | | 3/2015 | Limbacher et al. |
| 2015/0082603 | A1 | | 3/2015 | Rawdon et al. |
| 2015/0086295 | A1 | | 3/2015 | Cameron et al. |
| 2015/0184688 | A1 | | 7/2015 | Dobbin et al. |
| 2015/0345533 | A1 | * | 12/2015 | Hill ..................... F16B 35/00 |
| | | | | 411/374 |
| 2016/0131179 | A1 | | 5/2016 | Prouty et al. |
| 2017/0021209 | A1 | | 1/2017 | Damazo et al. |
| 2019/0331160 | A1 | * | 10/2019 | Cowan ................. F16B 37/14 |

FOREIGN PATENT DOCUMENTS

| | | |
|---|---|---|
| DE | 1085586 B | 7/1960 |
| EP | 2610506 A1 | 7/2013 |
| EP | 2713065 A2 | 4/2014 |
| EP | 2812248 A1 | 12/2014 |
| EP | 2860410 A1 | 4/2015 |
| EP | 2860411 A1 | 4/2015 |
| EP | 2996941 A1 | 3/2016 |
| EP | 3027917 A1 | 6/2016 |
| EP | 3059170 A1 | 8/2016 |
| EP | 3106380 A1 | 12/2016 |
| EP | 3287362 A1 | 2/2018 |
| EP | 3462046 A1 | 4/2019 |
| GB | 612381 A | 11/1948 |
| JP | H02102910 A | 4/1990 |
| JP | H03125911 U | 12/1991 |
| JP | H08-145032 A | 6/1996 |
| JP | 2000039010 A | 2/2000 |
| JP | 2001165138 A | 6/2001 |
| JP | 2002266832 A | 9/2002 |
| JP | 2004169853 A | 6/2004 |
| WO | WO-9729289 A1 | 8/1997 |
| WO | WO-0057069 A1 | 9/2000 |
| WO | WO-2009063063 A1 | 5/2009 |
| WO | WO-2012147645 A1 | 11/2012 |
| WO | WO-2012170672 A1 | 12/2012 |
| WO | WO-2013117756 A1 | 8/2013 |
| WO | WO-2013178985 A1 | 12/2013 |
| WO | WO-2014118117 A1 | 8/2014 |
| WO | WO-2014118510 A1 | 8/2014 |
| WO | WO-2015025130 A1 | 2/2015 |

OTHER PUBLICATIONS

European Search Report for Application No. 19179944.4 dated Sep. 10, 2019.
Communication Pursuant to Article 94(3) dated Oct. 16, 2019.
Extended European Search Report for EP Application No. 18196707.6 dated Feb. 19, 2019.
EP Search Report for Application No. EP14175808 dated Mar. 6, 2015.
PRC-Desoto International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.
Porex Corporation, "Porex(R) Battery Vents—Flame Arrestors," Porex Advanced Porous Materials, PXT-621-080513-00, Jan. 1, 2013, pp. 1-2, retrieved on Dec. 4, 2018, retrieved from internet: http://www.porex.com//files/documents/Porex-Battery-Vents--Letter-for-Web.pdf.
"Customized Sealants Solutions: PRC® Seal Caps," PPG Aerospace, product literature downloaded from ppaerospace.com on Sep. 7, 2016.
"HRL Researchers Develop World's Lightest Material," downloaded from HRL Laboratories website, HRL.com on Jul. 10, 2015.
"ERG Duocel® aluminum foam," product literature downloaded from ERG Aerospace website, ERGaerospace.com on Jul. 9, 2015.
Extended EP Search Report for EP Application No. 19204019.4 dated Mar. 30, 2020.
Written Opinion for EP Application No. 19204019.4 dated Mar. 30, 2020.
http://www.ppgaerospace.com/getmedia/9a234ec3-1db9-48de-94f7-c212ac2ba705/SealCapFlyer.pdf.aspx, PPG Aerospace PRC Seal Caps, retrieved Sep. 7, 2016.
http://www.porex.com/files/documents/Porex-Battery-Vents-Letter---English, Porex Battery Vents, 2013.
Extended European Search Report for foreign counterpart EP Application No. 16173069, dated Nov. 17, 2016.
Product Literature for ERG Duocel Aluminum Foam, downloaded from ERO Aerospace website, www.ergaerospace.com/literature/erg_duocel.pdf, Jul. 9, 2015.
"HRL Researchers Develop World's Lightest Material," downloaded from HRL Laboratories website, www.hrl.com/hrlDocs/pressreleases/2011/prsRls_111117, Jul. 10, 2015.
Bart Stevens et al., U.S. Appl. No. 15/718,618, filed Sep. 28, 2017.
Bart Stevens et al., U.S. Appl. No. 15/960,835, filed Apr. 24, 2018.
Sean Auffinger et al., U.S. Appl. No. 16/046,316, filed Jul. 26, 2018.
Daniel J. Cowan et al., U.S. Appl. No. 15/964,340, filed Apr. 27, 2018.
Toulouse, Mixed Metal-Composite Assembly, May 2013.
Boeing Proprietary, Zap Caps as Alternative to Seal Caps—Task No. 17728-01, dated Aug. 19, 2016, 30 pages.
Boeing Proprietary, Zap Cap Further Screening Test Plan for 787 Fuel Tank Use, Mar. 24, 2016, 24 pages.
Hutchinson Proprietary Document, Accessories: TP Nutcaps, 1 page.
Novaria/ESNA Design, dated Jul. 14, 2017, 3 pgs.
Boeing Part Standard, BACC50AP, dated Feb. 2, 2017, 16 pgs.
Click Bond Cap dated May 16, 2016, 4 pgs.
Drawings of Boeing Part Standard, BACC50AP, dated Feb. 2, 2017, 2 pgs.

(56) References Cited

OTHER PUBLICATIONS

Photographs of Boeing Proprietary, Zap Cap Further Screening Test Plan for 787 Fuel Tank Use, Mar. 24, 2016, 1 pg.
European Search Report for EP Application No. EP19217717 dated May 8, 2020.
Novaria/ESNA Design, dated Jul. 14, 2017, 3 pgs (Under Seal).
EP Search Report for EP Application No. 19167831.7 dated Aug. 29, 2019.
EP Search Report for Application No. EP19166688 dated Aug. 29, 2019.
EP Office Action for Application No. 19166688.2 dated Sep. 20, 2019.
Extended European Search Report for EP Application No. 20176033.7 dated Oct. 23, 2020.

* cited by examiner

ANCHORING WASHER FOR AN EME PROTECTION CAP SYSTEM

FIELD

This disclosure relates to an electrical insulation cap assembly for insulating metallic fasteners from transmitting current or sparks into the vicinity of the location of the metallic fastener assembly with the occurrence of electromagnetic effect ("EME") or lightning strike event and more particularly for electrical insulating containment caps which enclose a metallic threaded fastener.

BACKGROUND

Electrically insulated sealant and containment caps have been used to cover an end portion of a metallic fastener assembly which includes a nut and a threaded end portion of a stud which extends beyond the nut and which may include one or more washers. The sealant caps electrically insulate the end portion of the metallic fastener assembly so as to electrically isolate and contain the end portion of the metallic fastener assembly from critical surroundings of the metallic fastener assembly such as within a vicinity of a fuel tank or sensitive electronic equipment within an aircraft. Electrically isolating and containing the end portion of the metallic fastener assembly prevents unwanted sparks or electrical current transmissions entering into such important surroundings upon an EME or lightning strike event.

The insulation and containment caps are made from sealant material such as for example a thermoset plastic. The caps are also filled with a liquid form of sealant material. Once the cap is filled with liquid sealant, the cap is positioned over the end portion of the metallic fastener assembly enclosing the end portion of the metallic fastener assembly within the cap and a surface of a structure from which the end portion of the metallic fastener assembly extends. At times sealant is expelled from the cap being over filled with sealant. This expelling of sealant can also occur by way of a sufficient amount of sealant being present such that expelling of some sealant from the cap can occur which indicates an adequate amount of sealant has been used. The expelled sealant in either occurrence must then be smoothed out about the cap to ensure proper sealing of the cap and for aesthetics. This smoothing out process is tedious and time consuming.

The cap also requires being held in place for a time period so as to maintain the cap's position to prevent an occurrence of the cap experiencing slumping or lifting off of the surface of a structure from which the end portion of the metallic fastener assembly extends during the curing of the sealant. The cap-to-structure joints are subject to high quality standards and often require rework.

There is a need to reduce the time to install EME or lightning strike event protective caps enclosing end portions of metallic fastener assemblies in high criticality areas such as in the proximity of fuel tanks or sensitive electronic equipment of an aircraft. In addition there is a need to have a reliable securement mechanism for securing the caps to the end portions of the metallic fasteners.

SUMMARY

A cap system for enclosing a metallic fastener assembly extending through a structure including a first securement mechanism positioned about a periphery of a washer of the metallic fastener assembly wherein the first securement mechanism includes threads. A cap member includes a sidewall having an inner surface which defines a cavity dimensioned to receive the washer and defines a second securement mechanism complementary configured to engage the first securement mechanism positioned about the periphery of the washer. The cap system further includes an end of the sidewall of the cap member defines an opening which provides the washer to have access into the cavity.

A cap system for enclosing a metallic fastener assembly extending through a structure including a first securement mechanism positioned about a periphery of a washer of the metallic fastener assembly wherein the first securement mechanism includes a first tab member extending in a direction transverse to a plane of a surface of the washer and a second tab member extending in a direction transverse to the plane of the surface of the washer spaced apart from the first tab member about the periphery of the washer. The cap system further includes a cap member including a sidewall having an inner surface which defines a cavity dimensioned to receive the washer and defines a second securement mechanism complementary configured to engage the first securement mechanism positioned about the periphery of the washer. The cap system further includes an end of the sidewall of the cap member defines an opening which provides the washer to have access into the cavity.

The features, functions, and advantages that have been discussed can be achieved independently in various embodiments or may be combined in yet other embodiments further details of which can be seen with reference to the following description and drawings.

DESCRIPTION

Figure 1:
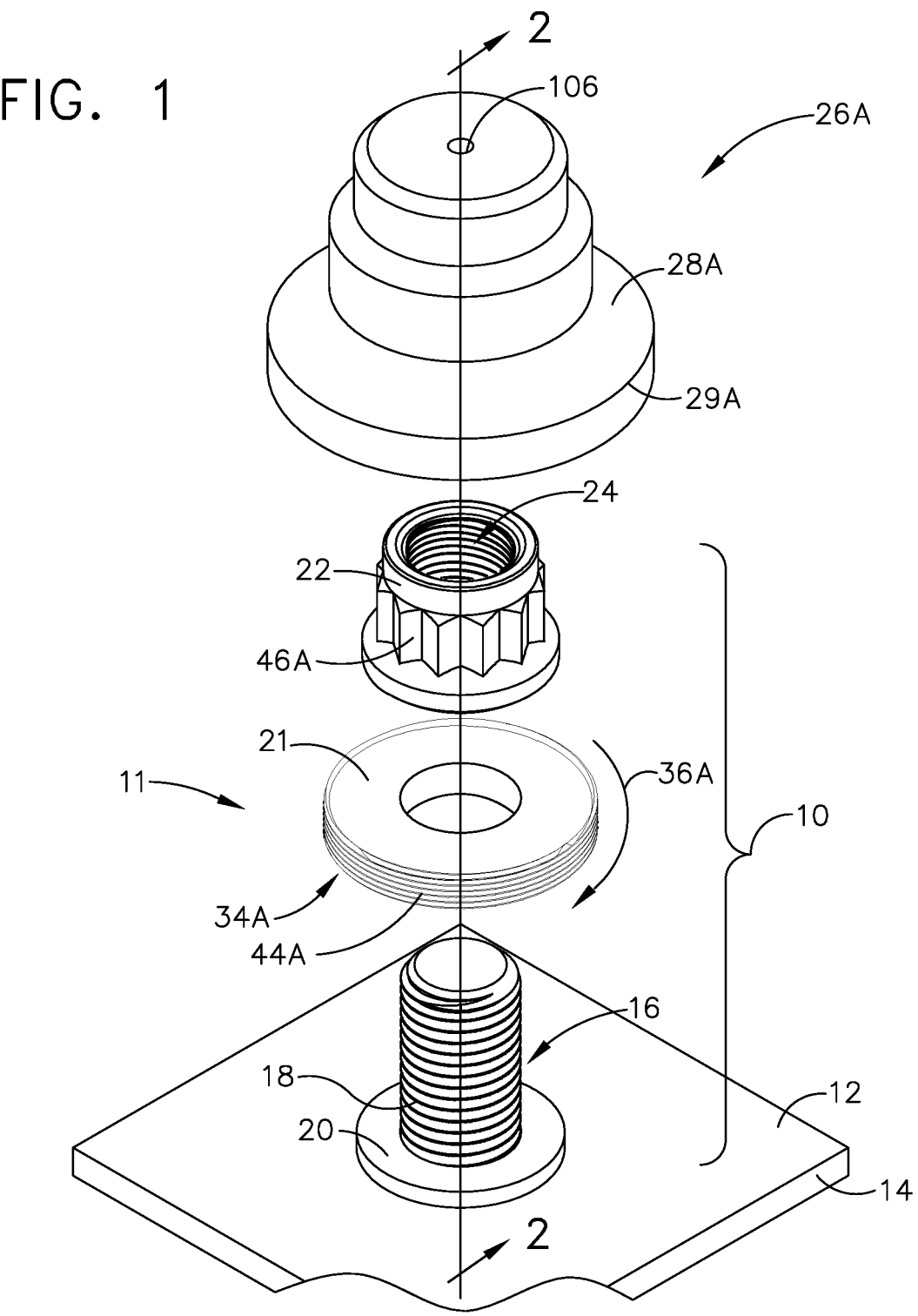
FIG. 1 is an exploded perspective view of a first embodiment of a cap system for enclosing an end portion of a metallic fastener assembly extending from a structure.

A cap system described herein will be employed to enclose an end portion of a metallic fastener assembly which is secured to and projects from a structure, in this example, a structure positioned within an aircraft. The cap system has a cap member. The cap member is to be positioned over and enclose the end portion of the metallic fastener assembly which extends from the structure and the cap member secures to the metallic fastener assembly. With an end of the cap member positioned abutting a surface of the structure, the end portion of the metallic fastener assembly is enclosed within the confines of the cap member and a surface of the structure. With positioning the cap member to enclose the end portion of the metallic fastener assembly the cap member also secures to the metallic fastener assembly.

The cap is constructed of a nonconductive material such as a polymer, thermoset or of other nonconductive material and a nonconductive sealant material may be additionally used in association with the cap member to further electrically isolate the end portion of the metallic fastener assembly from the surrounding vicinity of the metallic fastener assembly positioned outside of the cap member. Surrounding vicinities within an aircraft which would need electrical transmission isolation from a metallic fastener assembly include areas such as a fuel tank, areas which contain sensitive electronic equipment or areas which could otherwise be adversely affected by a transmission from an EME or lightning strike event such as experienced by an aircraft.

A metallic fastener assembly, in this example, two configurations could include a threaded stud which includes at one end a nut or could include a threaded bolt which at one end includes a head. In employing a first configuration of the metallic fastener assembly a threaded stud is extended through the structure(s) and a nut is positioned onto the threaded stud on one side of the structure(s) to which the metallic fastener assembly is to be secured. A nut member with threads compatible to the threads of the threaded stud is engaged to the threaded stud on an opposing second side of the structure(s), a side to which the cap system to be described herein will be positioned. At least one washer is positioned between the nut member and the structure(s) wherein the cap system includes a portion of the at least one washer which engages a cap member of the cap system and the cap member encloses the nut member, the at least one washer and the threaded stud projecting from the structure(s).

In a second configuration of the metallic fastener assembly a threaded bolt is extended through the structure(s) with the head of the threaded bolt positioned on one side of a structure(s) to which the metallic fastener assembly is to be secured. A nut member with threads compatible to the threads of the threaded bolt is engaged onto the bolt on an opposing second side of the structure(s), a side to which the cap system to be described herein will be positioned. At least one washer is positioned between the nut member and the structure(s) wherein the cap system includes a portion of the at least one washer which engages a cap member of the cap system and the cap member encloses the nut member, the at least one washer and the threaded bolt projecting from the structure(s).

In a third configuration of the metallic fastener assembly a threaded bolt is extended through the structure(s) with the head of the threaded bolt positioned on the side of the structure(s) in which the cap system to be described herein will be positioned. A nut with compatible threads is secured to the threaded bolt on an opposite side of the structure(s). At least one washer is positioned between the head and the structure(s) wherein the cap system includes a portion of the at least one washer which engages a cap member of the cap system and the cap member encloses the head and the at least one washer.

In the first and second configuration of the metallic fastener assembly, with the tightening of the nut member on the threaded stud or on the threaded bolt in a direction toward the structure(s) a compressive force is applied to the structure(s) positioned between the nut (not shown) and the nut member with respect to the threaded stud or the compressive force is applied to the structure(s) positioned between the head (not shown) and the nut member with respect to the threaded bolt. With the compressive force applied with the nut member on one of a threaded stud or threaded bolt of the metallic fastener assembly, the metallic fastener assembly is in a secured position with respect to the structure(s). In the third configuration of the metallic fastener assembly, with tightening of the head of the threaded bolt in a direction toward the structure(s) a compressive force is applied to the structure(s) positioned between the head and the nut secured to the threaded bolt positioned on the other side of the structure(s). With the compressive force applied the threaded fastener assembly in this third configuration, the metallic fastener assembly is in a secured position with respect to the structure(s).

With the metallic fastener assembly in a secured position with respect to the structure(s) and with a cap member of the cap system enclosing an end portion of the metallic fastener assembly positioned projecting from a side of the structure(s) the cap member of the cap system at the same time secures to a portion of at least one washer of the cap system, and the cap member will be secured to the metallic fastener assembly and positioned against the structure.

In referring to FIG. 1, in this example, an end portion 10 of metallic fastener assembly 11 is shown projecting from surface 12 of structure 14. Structure 14 is shown schematically wherein structure 14 may include one or more components to which metallic fastener assembly 11 is secured. Metallic fastener assembly 11 in this example includes threaded stud or bolt 16 which has a nut (not shown) or head (not shown) positioned beneath structure 14. Threaded stud or threaded bolt 16 has threads 18, metallic fastener assembly 11 includes, in this example, washer 20 which is positioned surrounding threaded stud or threaded bolt 16 and abuts surface 12 of structure 14. Metallic fastener assembly 11 further includes washer 21 positioned on washer 20. Metallic fastener assembly 11 also includes nut member 22 which has threads 24 positioned within nut member 22 which are compatible to engage with threads 18 of threaded stud or threaded bolt 16 wherein threaded stud or threaded bolt 16 extends through structure 14. Threads 24 of nut member 22 can engage threads 18 of threaded stud or threaded bolt 16 and be tightened down resulting in exerting a compressive force with respect to structure 14. With structure 14 positioned between nut member 22 and nut (not shown) or head (not shown) of threaded stud or threaded bolt 16, respectively, of metallic fastener assembly 11, metallic fastener assembly 11 obtains a secured position with respect to structure 14. In this example, washer 21 is positioned between nut member 22 and washer 20.

Figure 2:
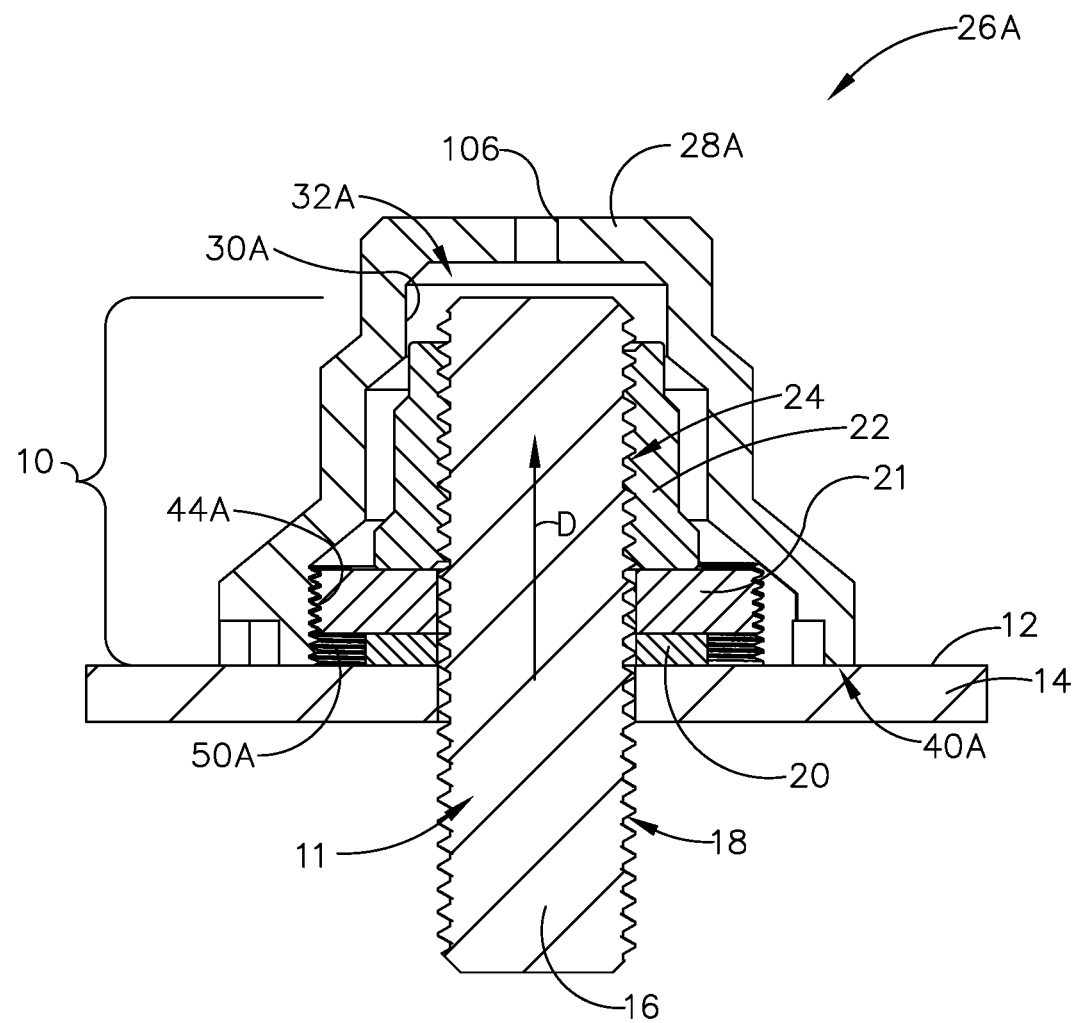
FIG. 2 is a cross section view along line 2-2 of FIG. 1 of the first embodiment of the cap system assembled.
Figure 3:
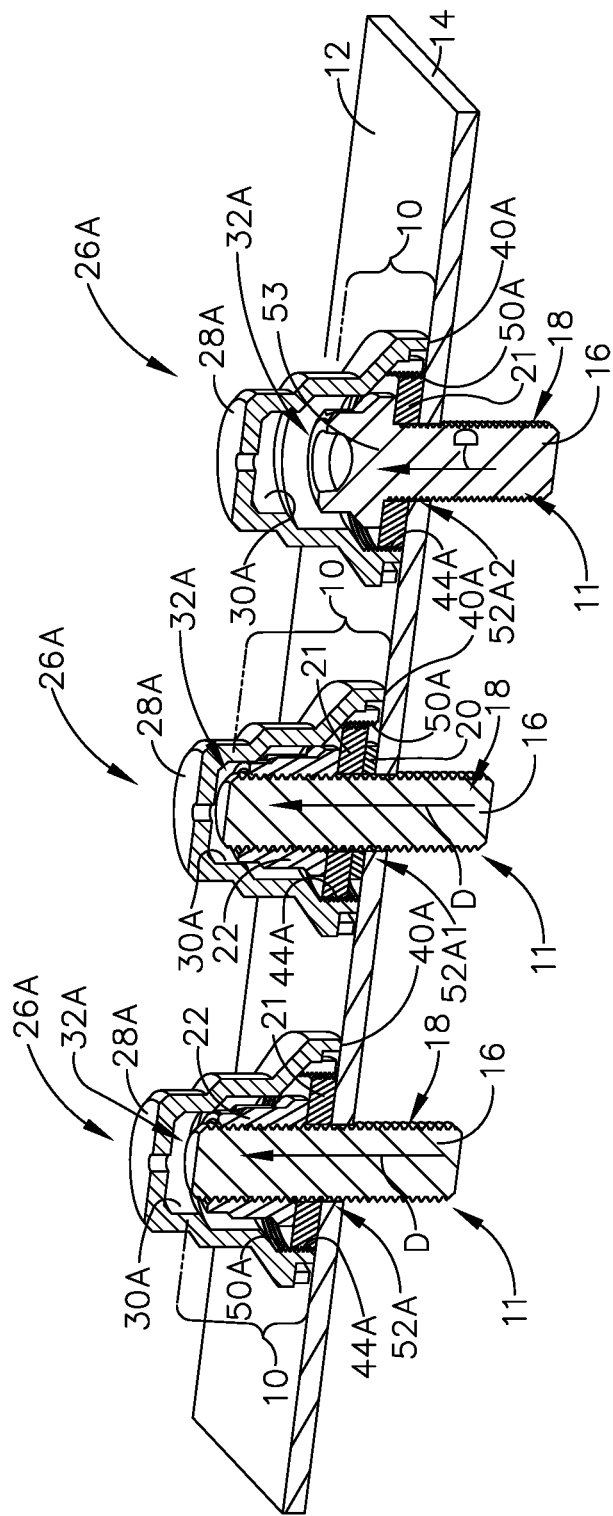
FIG. 3 is a perspective cross section view of employment of the first embodiment of the cap system of FIG. 1 utilizing three different example configurations of the metallic fastener assembly.
Figure 4:
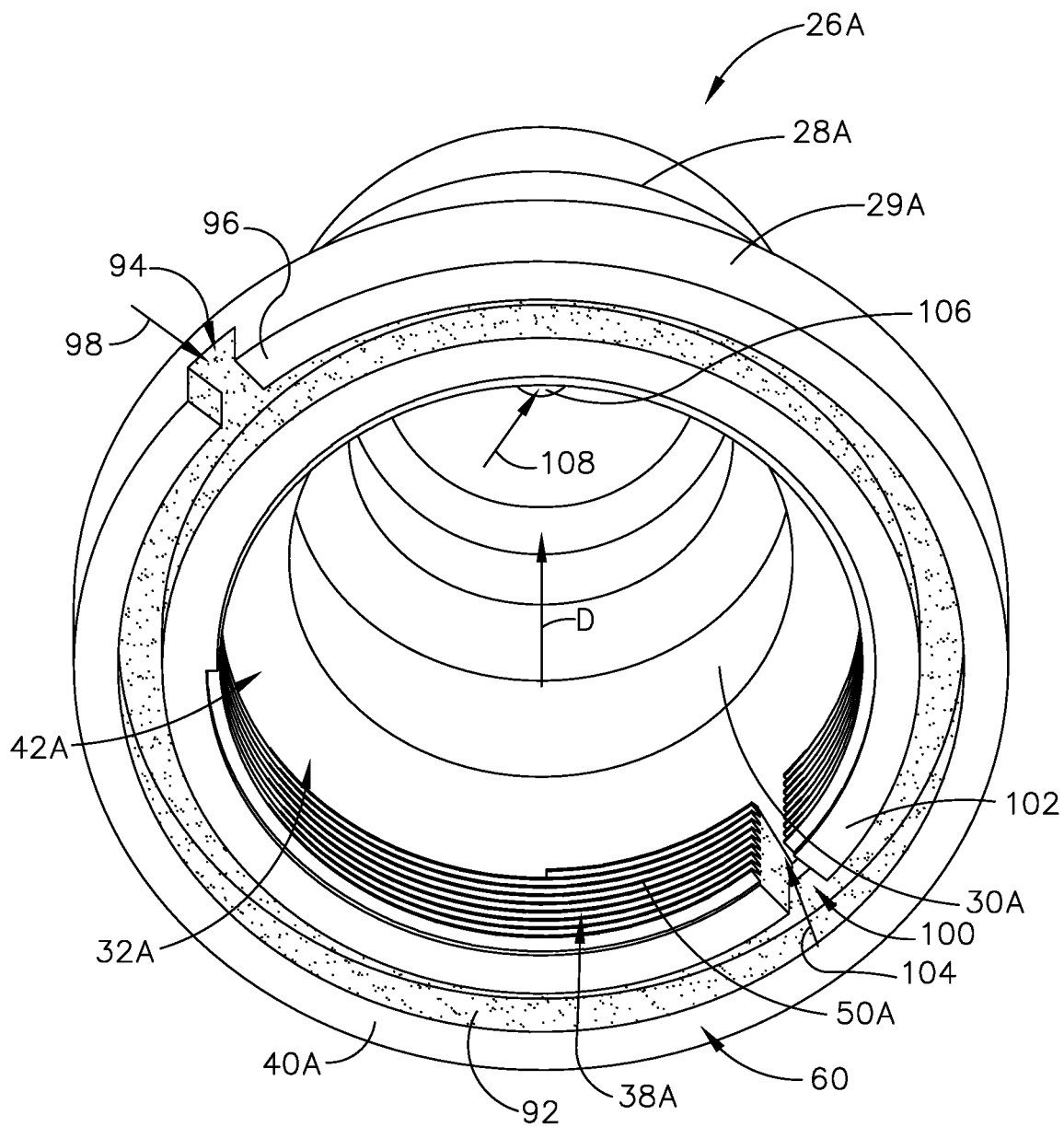
FIG. 4 is an enlarged bottom perspective view of the first embodiment of the cap member of FIG. 1 showing a first example of the end of the cap member.

In FIG. 1, first embodiment of cap system 26A is shown enclosing metallic fastener assembly 11 extending through structure 14. Cap system 26A has cap member 28A. As mentioned earlier cap member 28A will be constructed of a nonconductive material such as one of a polymer, thermoset or other nonconductive materials. Cap member 28A has sidewall 29A having inner surface 30A, as seen in FIGS. 2-4. First securement mechanism 34A of cap system 26A, as seen in FIG. 1, is positioned about periphery 36A of washer 21 of metallic fastener assembly 11. Cap member 28A includes sidewall 29A having inner surface 30A which defines cavity 32A dimensioned to receive washer 21 and defines second securement mechanism 38A, as seen in FIG. 4, which is complementary configured to engage first securement mechanism 34A positioned about periphery 36A of washer 21. End 40A of sidewall 29A of cap member 28A defines opening 42A which provides in this example washers 20, 21, nut member 22 including threaded portion of one of threaded stud or threaded bolt 16 which projects from structure 14 to have access into cavity 32A.

As seen in FIG. 1, first securement mechanism 34A includes threads 44A positioned on washer 21. Nut member 22 includes ridge members 46A, in this example, which are configured to receive and engage a standard socket wrench for tightening nut member onto washers 20 and 21 and securing washers 20 and 21 against structure 14.

Second securement mechanism 38A includes threads 50A defined by inner surface 30A of sidewall 29A of cap member 28A, as seen in FIG. 4. Threads 50A extend about inner surface 30A of cap member 28A and extend in a direction D away from end 40A of sidewall 29A of cap member 28A. As will be discussed further below, with nut member 22 and threaded stud or threaded bolt 16 in a secured position with respect to structure 14 and with threads 50A engaging threads 44A of washer 21, end 40A of sidewall 29A of cap member 28A is positioned against structure 14 enclosing end portion 10 of metallic fastener assembly 11 and cap member 28A is secured to washer 21 of metallic fastener assembly 11. With threads 50A extending in direction D, threads 50A extend toward higher elevations with respect to surface 12 with end 40A abutting surface 12 as shown in FIG. 3. Threads 50A can accommodate and engage threads 44A of washer 21 as threads 44A may differ in elevation position relative to surface 12 as will be shown and discussed with respect to FIG. 3, thereby ensuring securement of cap member 26A to end portion 10 of metallic fastener assembly 11 and end 40A abutting surface 12 enclosing end portion 10.

In FIG. 3, first example 52A of end portion 10 of metallic fastener assembly 11 extending above surface 12 of structure 14 is seen wherein first embodiment of cap system 26A is shown enclosing of end portion 10 and securing to end portion 10 of metallic fastener assembly 11. In first example 52A, nut member 22 is secured to threads 18 of threaded stud or threaded bolt 16 and nut member 22 directly abuts washer 21 which in turn abuts surface 12. Threads 44A of washer 21 are engaged to threads 50A wherein threads 44A are positioned above surface 12 at an elevation profile lesser than that of threads 44A in second example 52A1.

In second example 52A1, in FIG. 3, first embodiment of cap system 26A encloses and secures to end portion 10 of metallic fastener assembly 11 which is positioned extending in this example above surface 12. In second example 52A1, nut member 22 is secured to threads 18 of threaded stud or threaded bolt 16 and nut member 22 is positioned on washer 21 which positions threads 44A of washer 21 which engage to threads 50A of cap member 28A. Threads 44A are positioned above surface 12 at a higher elevation profile than that of threads 44A of washer 21 of first example 52A. Threads 50A of cap member 28A extend in direction D as seen in FIG. 4 permitting threads 44A of washer 21 to be engaged to threads 50A in both the first example 52A and second example 52A1 with end 40A of sidewall 29A of cap member 28A abutting surface 12 of structure 14. As a result, cap member 28A encloses end portion 10 of metallic fastener assembly 11 and secures to end portion 10 of metallic fastener assembly 11 with the engagement of threads 44A of washer 21 with threads 50A of cap member 28A regardless of the difference in elevation profile of threads 44A with respect to surface 12, as seen in first example 52A and 52A1.

Thus, with an installer having tightened nut member 22, of the first and second examples 52A and 52A1 in FIG. 3 with threads 24 compatible with threads 18 of threaded stud or threaded bolt 16, into a secured position relative to structure 14, the installer can then position first embodiment of cap 28A to have threads 44A of washer 21 engage threads 50A of cap member 28A. The installer can then turn and tighten cap member 28A, with threads 44A and 50A engaged, until end 40A is positioned against or abuts surface 12. Cap member 28A is then secured to surface 12 and secured to metallic fastener assembly 11 enclosing end portion 10 of metallic fastener assembly 11. As explained above, with threads 50A extending in direction D, threads 44A of washer 21 positioned at different elevation profiles above surface 12 can engage and reliably secure to threads 50A thereby securing cap member 28A to end portion 10 of metallic fastener assembly 11 and with end 40A abutting surface 12 cap member 28A securely encloses end portion 10 of metallic fastener assembly 11.

In the third example 52A2, as seen in FIG. 3, metallic fastener assembly 11 includes head 53 of a threaded bolt member 16 wherein head 53 is positioned in overlying relationship to washer 21. Head 53 is positioned in a secure relationship with respect to structure 14 with a nut (not shown) positioned below structure 14 secured to threads 18 of threaded bolt 16. Washer 21 is positioned between head 53 and structure 14 and with threads 44A positioned about periphery 36A of washer 21 engaging threads 50A defined by inner surface 30A of cap member 28A, end 40A, as seen in FIG. 4, of cap member 28A is positioned against structure 14.

In this third example 52A2, the installer having tightened head 53 onto threads 18 of threaded bolt 16 into a secured position relative to structure 14 with nut (not shown) positioned on threaded bolt 16 positioned on opposite side of structure 14 than head 53, the installer can then position first embodiment of cap 28A to have threads 44A of washer 21 engage threads 50A of cap member 28A. The installer can then turn and tighten cap member 28A, with threads 44A and 50A engaged, until end 40A abuts surface 12. Cap member 28A is then secured to surface 12 and secured to metallic fastener assembly 11 enclosing end portion 10 of metallic fastener assembly 11. As explained above, with threads 50A extending in direction D, threads 44A of washer 21 positioned at different elevation profiles, based on for example an addition of a washer, above surface 12 threads 44A can engage and reliably secure to threads 50A thereby securing cap member 28A to end portion 10 of metallic fastener assembly 11 and with end 40A abutting surface 12, cap member 28A securely encloses end portion 10 of metallic fastener assembly 11.

Figure 5:
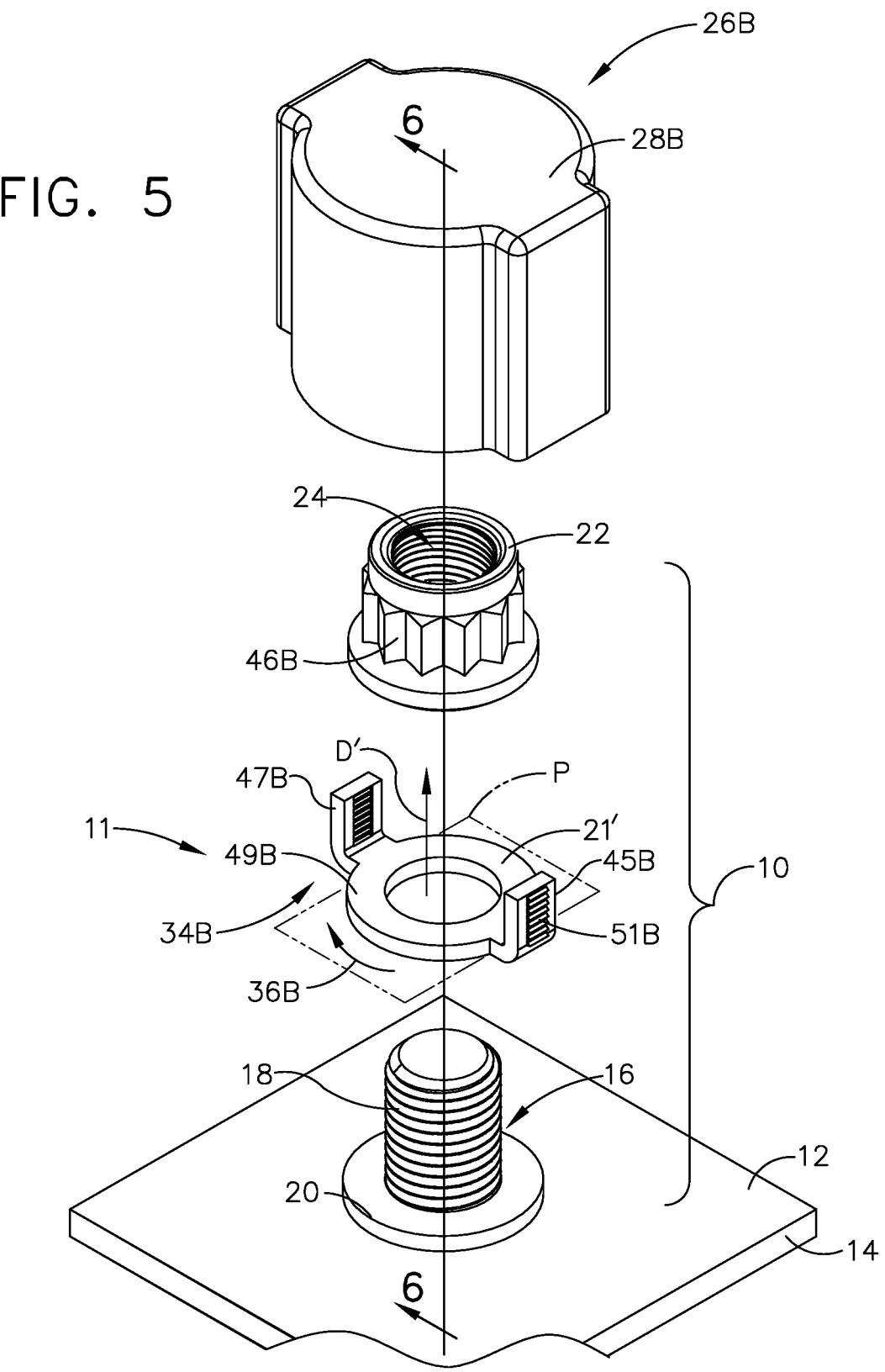
FIG. 5 is an exploded perspective view of a second embodiment of the cap system for enclosing an end portion of the metallic fastener assembly extending from the structure.
Figure 6:
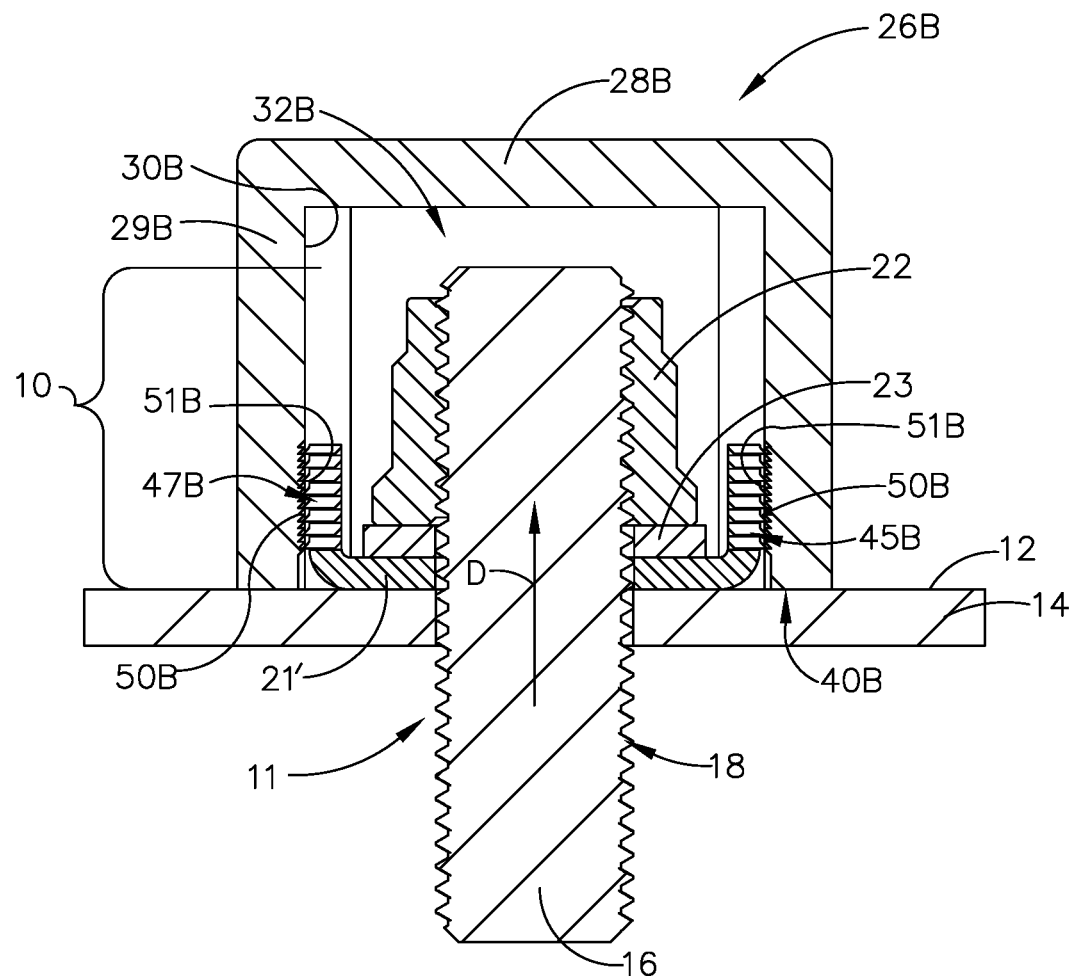
FIG. 6 is a cross section view along line 6-6 of FIG. 5 of the second embodiment of the cap system assembled.
Figure 7:
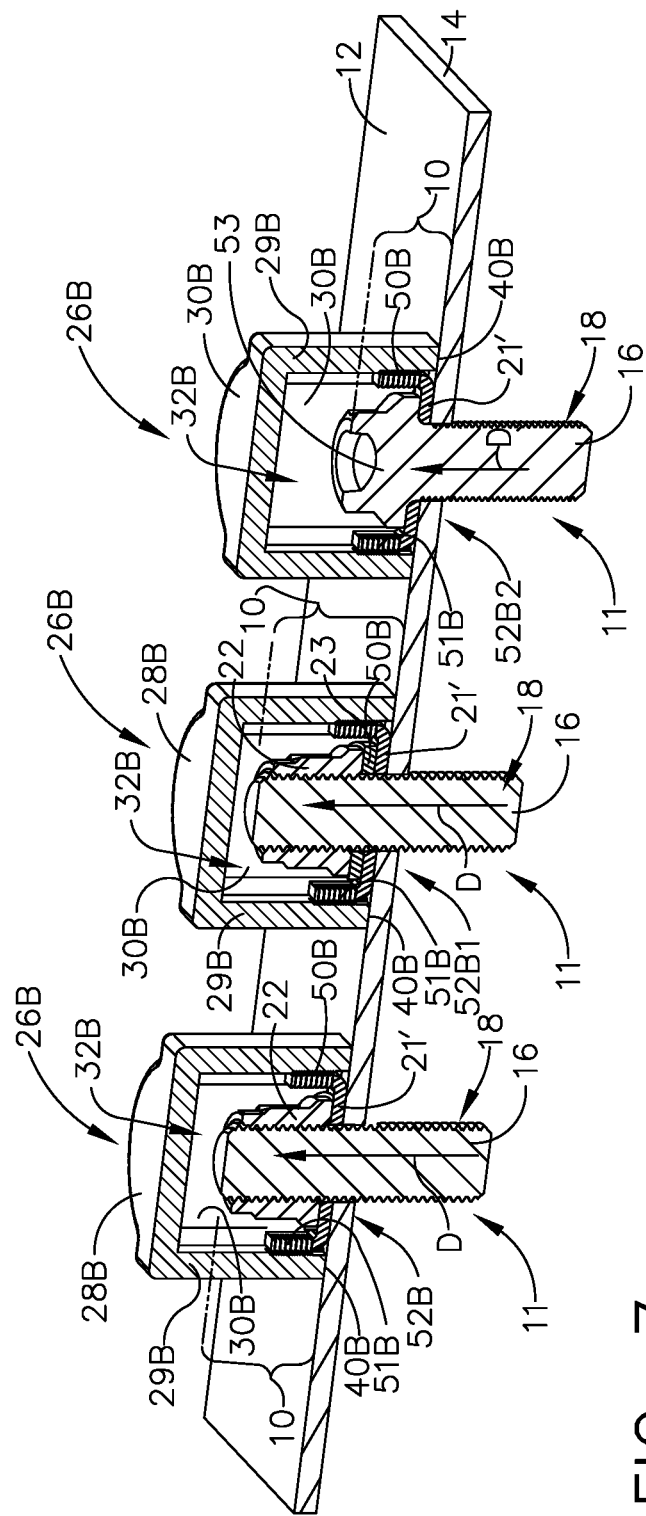
FIG. 7 is a perspective cross section view of employment of the second embodiment of the cap system of FIG. 5 utilizing three different example configurations of the metallic fastener assembly.
Figure 8:
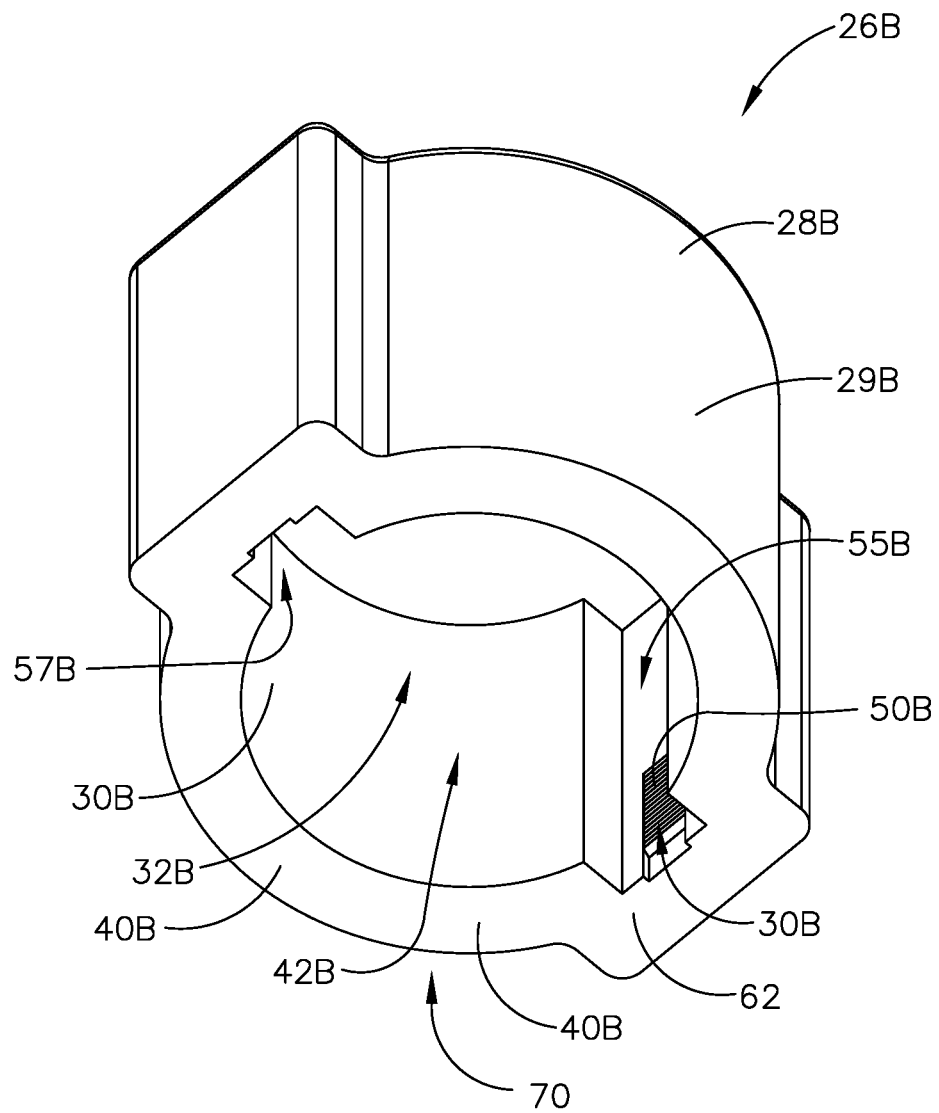
FIG. 8 is an enlarged bottom perspective view of the cap member of FIG. 5 showing a second example of the end of the cap member.

In referring to FIG. 5, second embodiment of cap system 26B is shown enclosing metallic fastener assembly 11 extending through structure 14. Cap system 26B has cap member 28B. As mentioned earlier cap member 28B will be constructed of a nonconductive material such as one of a polymer, thermoset or other nonconductive material and will be more flexible of a material than a metal construction of the metallic fastener assembly 11 including the portion of the washer 21' or first securement mechanism 34B. Cap member 28B has sidewall 29B having an inner surface 30B, as seen in FIGS. 6-8. First securement mechanism 34B of cap system 26B, as seen in FIG. 5, is positioned about periphery 36B of washer 21 of metallic fastener assembly 11. Cap member 28B includes sidewall 29B having an inner surface 30A which defines cavity 32B dimensioned to receive washer 21' and defines second securement mechanism 38B, which is seen in FIG. 8, which is complementary configured to engage first securement mechanism 34B positioned about periphery 36B of washer 21. End 40B of sidewall 29B of cap member 28B defines opening 42B which provides in this example washers 20, 21', nut member 22 and threaded portion of one of threaded stud or threaded bolt 16 which projects from structure 14 to have access into cavity 21BAs seen in FIG. 5.

First securement mechanism 34B includes first tab member 45B extending in a direction D' transverse to a plane P of surface 49B of washer 21' and second tab member 47B extending in the direction D' transverse to the plane P of the surface 49B of washer 21' spaced apart from first tab member 45B about periphery 36B of washer 21'. Each of first and second tab members 45B and 47B include plurality of grooves 51B. Nut member 22 includes plurality of ridges 46B which are compatible with a standard socket wrench so as to receive and engage a standard socket wrench for tightening nut member 22 onto washers 20 and 21' against structure 14. Second securement mechanism 38B includes plurality of teeth 50B defined by inner surface 30B of sidewall 29B of cap member 28B, as seen in FIG. 8. Plurality of teeth 50B extend about at least a portion of inner surface 30B of sidewall 29B of cap member 28B. Plurality of teeth 50B extend in a direction D away from end 40B of sidewall 29B of cap member 28B. As will be discussed further below, with nut member 22 and threaded stud or threaded bolt 16 in a secured position in relationship to structure 14 and with plurality of teeth 50B engaging at least a portion of continuous threads 44B of washer 21, end 40B is positioned against structure 14 enclosing end portion 10 of metallic fastener assembly 11. Plurality of teeth 50B can be extended in direction D away from end 40B of cap member 28B if needed. Plurality of teeth 50B can extend (not shown) toward higher elevations above surface 12 of structure 14 which can accommodate different positions of elevation profile of plurality of grooves 51B with end 40B in abutting relationship with surface 12 of structure 14. As a result, plurality of teeth 50B can accommodate and engage plurality of grooves 51B of washer 21' at different elevations of position of grooves 51B with respect to structure 14 if needed. Plurality of teeth 50B as mentioned earlier are constructed of a material more flexible than the material which constructs the plurality of grooves 51B. In this instance, as the installer pushes downwardly or toward structure 14 plurality of teeth 50B flex as they contact grooves 51B. With end 40B positioned against structure 14 plurality of teeth 50B in alignment with plurality of grooves 51B, plurality of teeth 50B flex back and engage plurality of grooves 51B.

With installer inserting first and second tab members 45B and 47B into cap member 28B, first and second tab members 45B and 47B respectively are aligned with first slot 55B and second slot 57B, respectively as seen in FIG. 8 defined by cap member 28B. This alignment of first and second tab members 45B and 47B with first and second slots 55B and 57B respectively, provides the installer easy alignment of plurality of grooves 51B with plurality of teeth 50B and provides resistance of rotational movement of cap member 28B relative to washer 21'.

In FIG. 7, first example 52B of end portion 10 of metallic fastener assembly 11 extending in this example above surface 12 of structure 14 is seen wherein second embodiment of cap system 26B is shown enclosing of and securing to end portion 10 of metallic fastener assembly 11. In first example 52B, nut member 22 is secured to threads 18 of threaded stud or threaded bolt 16 and directly abuts washer 21' and with plurality of grooves 51B engaged with plurality of teeth 50B, end 40B is positioned against structure 14.

In second example 52B1, in FIG. 7 second embodiment of cap system 26B encloses and secures to end portion 10 of metallic fastener assembly 11 wherein washer 21' is positioned in the same position as shown in first example 52B however washer 23 is positioned between washer 21' and nut member 22. In this example plurality of teeth 51B extend in direction D. However, plurality of teeth 51B can be limited in this example in how far plurality of teeth 51B extend from end 40B since elevation of plurality of grooves 51B of first and second tab members 45B and 47B with respect to first and second examples 52B and 52B1 are without change. In second example 52B1, nut member 22 is secured to threads 18 of threaded stud or threaded bolt 16 and is positioned on washer 23 which elevates nut member 22 however, washer 21' remains on structure 14 at the same elevation as seen in first example 52B. Metallic fastener assembly 11 further includes nut member 22. Nut member 22 has threads 24 compatible with threads of one of threads of a threaded stud of the metallic fastener assembly or threads of a threaded bolt 16 of metallic fastener assembly 11, is positioned on one of the threaded stud or the threaded bolt 16 of metallic fastener assembly 11 in a secured position with respect to the structure 14. With washer 21' positioned between nut member 22 and structure 14, in this example with washer 23 positioned between nut member 22 and washer 21', with plurality of grooves 51B aligned with plurality of teeth 50B, end 40B of cap member 28B is positioned against structure 14.

In the third example 52B2, in FIG. 7, head 53 of threaded bolt 16 is positioned on washer 21'. In this third example of the metallic fastener assembly 11 head 53 of threaded bolt member 16 is positioned in overlying relationship to washer 21' such that with head 53 in a secure relationship with respect to structure 14, with washer 21' positioned between head 53 and structure 14 and with plurality of grooves 51B aligned with plurality of teeth 50B, end 40B of cap member 28B is positioned against structure 14.

In installing cap member 28B metallic fastener assembly 11 is in this example in a secured relationship with respect to structure 14. The installer positions cap member 28B over end portion 10 of metallic fastener assembly 11 and pushes cap member 28B toward structure 14 until end 40B is positioned against structure 14 and plurality of grooves 51B are aligned and engaged with plurality of teeth 50B. As a result cap member 28B is secured to metallic fastener assembly 11 and end portion 10 of metallic fastener assembly 11 is enclosed and electrically isolated from electrically sensitive areas of the aircraft.

Figure 9:
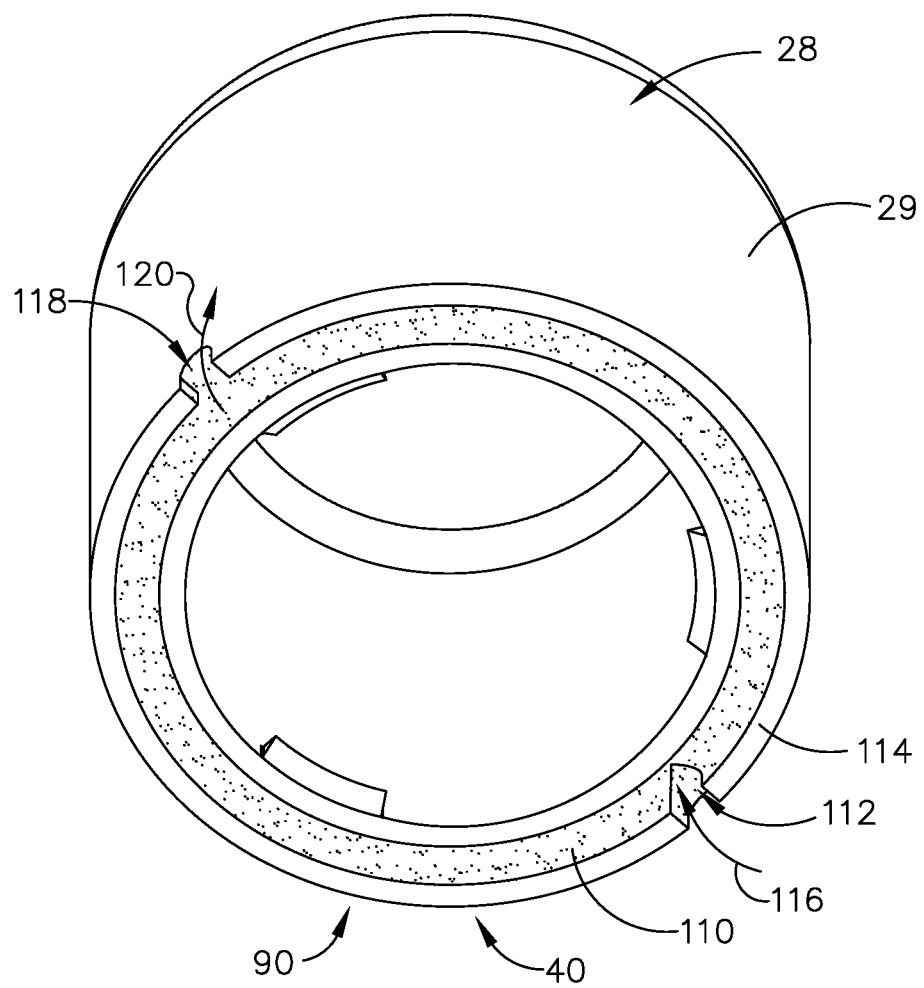
FIG. 9 is an enlarged bottom perspective schematic view of a cap member showing a third example of the end of the cap member.

In installing cap members of the cap system described above, configurations of ends 40A, 40B and 40 as seen in FIGS. 4, 8 and 9, can be selectively employed to the different embodiments of the cap members described herein. Three examples of configurations include examples 60, 70 and 90 to be discussed in greater detail below. For example, with respect to ends 40A and 40B, any of the three examples of end configurations 60, 70 or 90 can be employed.

In a first example 60 of configuration of an end is shown in FIG. 4 as end 40A. Sidewall 29A of cap member 28A defines groove 92 which extends about cap member 28A. First opening 94 defined by and extends through first portion 96 of sidewall 29A of cap member 28A such that first opening 94 communicates with groove 92. First flow path 98 extends through first portion 96 of sidewall 29A of cap member 28A and into groove 92 for conveyance of sealant. Second opening 100 defined by and extends through second portion 102 of sidewall 29A of cap member 28A such that second opening 100 communicates with groove 92 and second opening 100 communicates with cavity 32A of cap member 28A such that second flow path 104 extends from groove 92 through second opening 100 of sidewall 29A of cap member 28A and into cavity 32A. Once installer has injected sealant into groove 92 and sealant flows through groove 92 and expels into cavity 32A from second opening 100, the sealant continues to flow past nut member 22 between ridge members 46A, in this example, upwardly into cap member 28A. Third opening 106, as seen in FIGS. 1, 2 and 4, defined by and extends through sidewall 29A of cap member 28A such that third opening 106 provides third flow path 108, as seen in FIG. 4.

In this first example 60, once the installer has secured cap member 28A to surface 12 of structure 14, the installer will inject a sealant material into first opening 94 having sealant flow in groove 92 about cap member 28A. With groove 92 nearly full or full of sealant, sealant begins to leak from second opening 100. At that point, the installer is still injecting sealant into first opening 94 and cavity 32A becomes full of sealant at which point sealant begins to expel from third opening 106. At that point installer understands cap member 28A is full of sealant and stops injecting further sealant. With sealant expelling from third opening 106, installer has a confirmation that sealant has been positioned within groove 72 and cavity 32A providing additional assurance to the installer that end portion 10 of metallic fastener assembly 11 has been further electrically isolated within cap member 28A. This first example configuration provides the installer the ability to not expel excessive sealant onto surface 12 and reduces the need for tedious and time consuming smoothing out of excess sealant.

In the second example 70, shown in FIG. 8, end 40B of cap member 28B forms a continuous annular flat surface 62 which will abut surface 12 of a planar configuration of structure 14 as seen in FIGS. 6 and 7.

Third example 90 of configuration of an end, is shown in FIG. 9 as end 40. Sidewall 29 of cap member 28 defines groove 110 which extends about cap member 28. First opening 112 defined by and extends through first portion 114 of sidewall 29 of cap member 28 communicates with groove 110 such that a first flow path 116 extends through first opening 112 and into groove 110 for conveyance of sealant through first opening 112 into groove 110. Second opening 118, defined by and extends through first portion 114 of sidewall 29 of cap member 28, is spaced apart about cap member 28 from first opening 112 wherein second opening 118 communicates with groove 110 such that second flow path 120 extends from groove 110 through second opening 118 of cap member 28 for conveyance of sealant.

In this third example 90, once installer has secured cap member 28 to surface 12 of structure 14, the installer will inject a sealant material into first opening 112 having sealant flow in groove 110 about cap member 28 until sealant begins to leak from second opening 118. At that point the installer has a confirmation that sealant has been positioned within groove 110 providing additional assurance to the installer that end portion 40 of metallic fastener assembly 11 has been further electrically isolated within cap member 28. This third example 90 configuration provides the installer ability to not expel excessive sealant onto surface 12 and reduces the need for tedious and time consuming smoothing out of excess sealant.

While various embodiments have been described above, this disclosure is not intended to be limited thereto. Variations can be made to the disclosed embodiments that are still within the scope of the appended claims.

What is claimed:

1. A cap system for enclosing a metallic fastener assembly extending through a structure, comprising:
    a first securement mechanism positioned about a periphery of a washer of the metallic fastener assembly wherein the first securement mechanism comprises threads; and
    a cap member comprising:
        a sidewall having an inner surface which defines a cavity dimensioned to receive the washer and defines a second securement mechanism which comprises threads defined by the inner surface which extend about the inner surface of the cap member and complementary configured to engage the threads of the first securement mechanism positioned about the periphery of the washer; and
        an end of the sidewall of the cap member defines an opening which provides the washer to have access into the cavity, wherein the threads of the cap member extend in a direction away from the end of the sidewall of the cap member; and
    a nut member having threads compatible with one of a threaded stud or a threaded bolt of the metallic fastener assembly, wherein the nut member is positioned on the one of the threaded stud or the threaded bolt of the metallic fastener assembly in a secured position with respect to the structure with the washer positioned between the nut member and the structure.

2. The cap system of claim 1, wherein with the nut member in a secured position with respect to the structure, with the washer positioned between the nut member and the structure, and with the threads positioned about the periphery of the washer engaging the threads defined by the inner surface of the cap member, the end of the sidewall of the cap member is positioned against the structure.

3. The cap system of claim 1, wherein the end of the sidewall of the cap member comprises a planar surface.

4. The cap system of claim 1, wherein the cap member comprises a nonconductive material.

5. The cap system of claim 1, wherein the nut member includes ridge members.

6. The cap system of claim 5, wherein the ridge members are spaced apart from one another.

7. The cap system of claim 6, wherein the ridge members are positioned about the nut member for engaging a socket wrench.

8. The cap system of claim 1, wherein the end of the sidewall defines a groove which extends about the cap member.

9. The cap system of claim 8, wherein:
    a first opening defined by and extends through a first portion of the sidewall of the cap member wherein the first opening communicates with the groove such that a first flow path extends through the first portion of the sidewall of the cap member and into the groove for conveyance of sealant.

10. The cap system of claim 9, further including:
    a second opening defined by and extends through a second portion of the sidewall of the cap member wherein the second opening communicates with the groove and the second opening communicates with the cavity of the cap member such that a second flow path extends from the groove, through the second opening of the second portion of the sidewall of the cap member and into the cavity; and a third opening defined by and extends through the sidewall of the cap member wherein the third opening provides a third flow path from the cavity of the cap member through the third opening of the sidewall of the cap member.

11. The cap system of claim 9, wherein a second opening defined by and extends through the first portion of the sidewall of the cap member spaced apart about the cap member from the first opening wherein the second opening communicates with the groove such that a second flow path which extends from the groove through the second opening defined by the first portion of the sidewall of the cap member.

12. The cap system of claim 1, comprises a continuous annular flat surface.

13. A cap system for enclosing a metallic fastener assembly extending through a structure, comprising:
a first securement mechanism positioned about a periphery of a washer of the metallic fastener assembly wherein the first securement mechanism comprises threads; and
a cap member comprising:
a sidewall having an inner surface which defines a cavity dimensioned to receive the washer and defines a second securement mechanism which comprises threads defined by the inner surface which extend about the inner surface of the cap member and complementary configured to engage the threads of the first securement mechanism positioned about the periphery of the washer; and
an end of the sidewall of the cap member defines an opening which provides the washer to have access into the cavity, wherein the threads of the cap member extend in a direction away from the end of the sidewall of the cap member; and
a head of a threaded bolt member positioned in overlying relationship to the washer such that with the head in a secure relationship with respect to the structure, with the washer positioned between the head and the structure and with the threads positioned about the periphery of the washer engaging the threads defined by the inner surface of the cap member, the end of the sidewall of the cap member is positioned against the structure.

14. The cap system of claim 13, wherein the cap member comprises a nonconductive material.

15. The cap system of claim 13, wherein the end of the sidewall of the cap member defines a groove.

16. The cap system of claim 13, wherein the end of the sidewall of the cap member comprises a continuous annular flat surface.

17. A cap system for enclosing a metallic fastener assembly extending through a structure, comprising:
a first securement mechanism positioned abut a periphery of a washer of the metallic fastener assembly wherein the first securement mechanism comprises threads; and
a cap member comprising:
a sidewall having an inner surface which defines a cavity dimensioned to receive the washer and defines a second securement mechanism complementary configured to engage the first securement mechjanism positioned about the periphery of the washer; and
an end of the sidewall of the sidewall of the cap member defines an opening which provides the washer to have access into the cavity; wherein
the end of the sidewall of the cap member defines a groove which extends about the cap member;
a first opening defined by and extends through a first portion of the sidewall of the cap member wherein the first opening communicates with the groove such that a first flow path extends through the first portion of the sidewall of the cap member and into the groove for conveyance of sealant;
a second opening defined by and extends through a second portion of the sidewall of the cap member wherein the second opening communicates with the groove and the second opening communicates with the cavity of the cap member such that a second flow path extends from the groove, through the second opening of the sidewall of the cap member and into the cavity; and
a third opening defined by and extends through the sidewall of the cap member wherein the third opening provides a third flow path from the cavity of the cap member through the third opening of the sidewall of the cap member.

18. The cap system of claim 17, wherein the cap member comprises a nonconductive material.

19. The cap system of claim 17, further includes a nut member having threads compatible with one of a threaded stud or a threaded bolt of the metallic fastener assembly.

20. The cap system of claim 19, wherein the nut member comprises ridge members spaced apart from one another.

21. The cap system of claim 19, wherein the ridge members are positioned about the nut member for engaging a socket wrench.

* * * * *